Patented Dec. 3, 1940

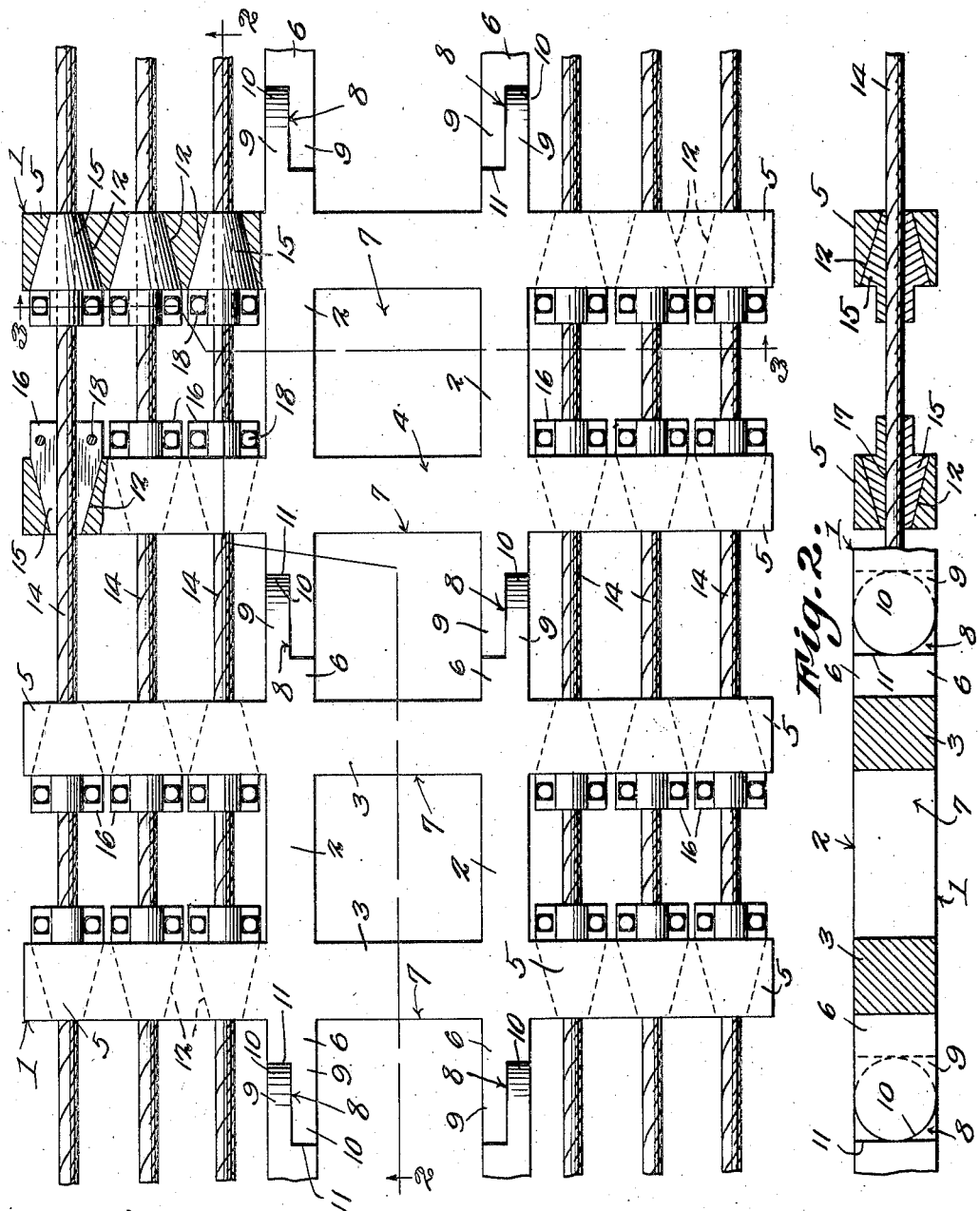

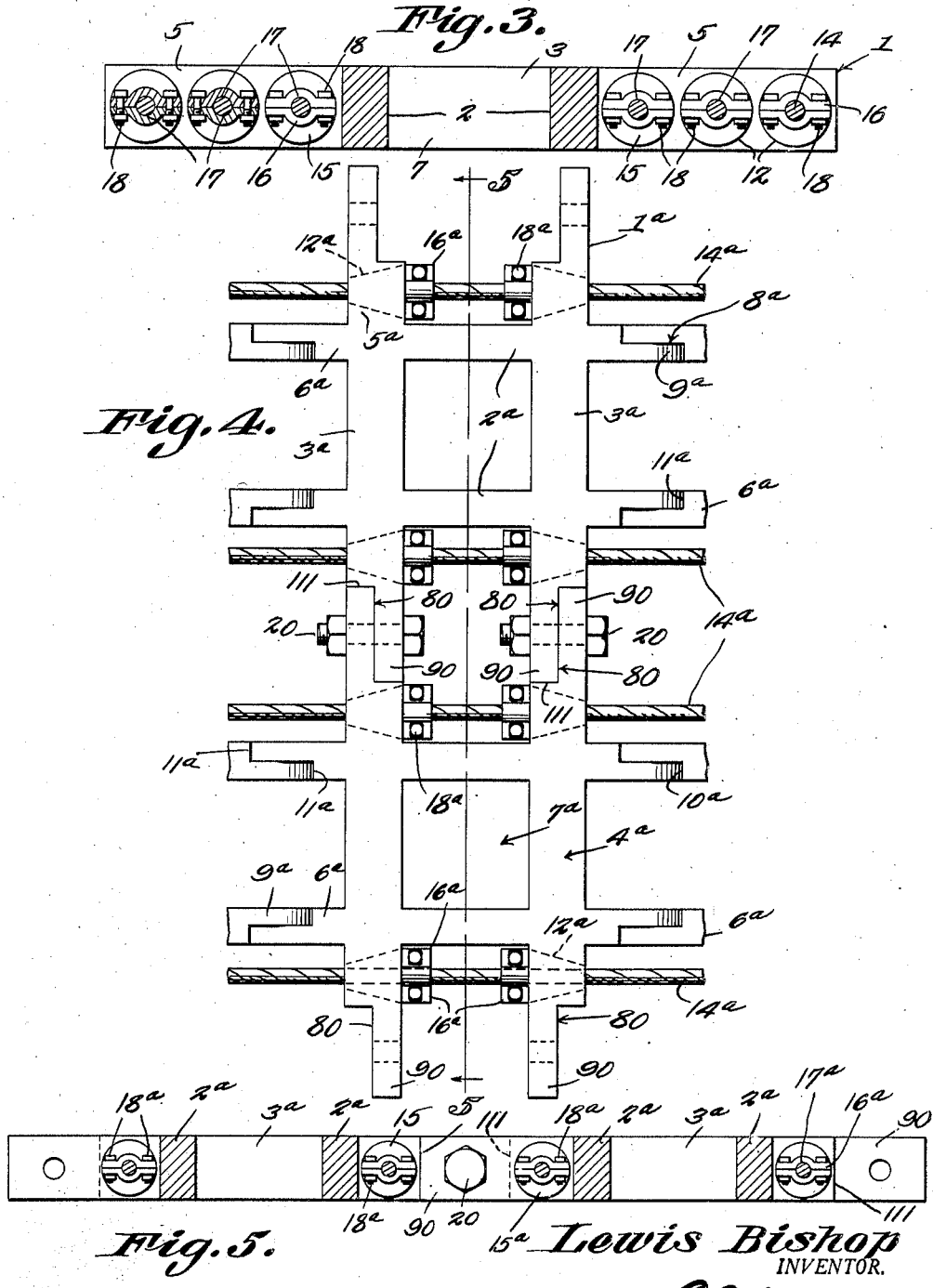

2,223,906

UNITED STATES PATENT OFFICE 2,223,906

LINK CABLE DRIVE

Lewis Bishop, Arcadia, Fla.

Application April 30, 1940, Serial No. 332,575

9 Claims. (Cl. 74—235)

It is a well known fact that sprocket chains, as ordinarily constructed, include pins, bushings and the like, subject to wear, the result being that the chain elongates, replacements and repairs being necessary.

The present invention aims to provide a sprocket chain in which the above mentioned difficulties do not exist. Another object of the invention is to supply a sprocket chain link of novel form, and a further object of the invention is to supply novel means for connecting a plurality of such links together, to form a sprocket chain.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in top plan, a portion of a sprocket chain constructed in accordance with the invention;

Fig. 2 is a section on the line 2—2 of Fig. 1;

Fig. 3 is a section on the line 3—3 of Fig. 1;

Fig. 4 is a top plan disclosing a modification;

Fig. 5 is a section on the line 5—5 of Fig. 4.

Referring to Figs. 1, 2 and 3, there is provided a one-piece sprocket chain link 1, preferably made of metal, the link being in the form of a double cross, all portions of the link being disposed in a common plane. The link comprises a pair of parallel longitudinal members 2, and a pair of parallel transverse members 3, the members 2 being disposed at right angles to the members 3, the members 2 and 3 defining a rectangular body 4, transverse arms 5 external to the body, and longitudinal arms 6 external to the body, the body having a rectangular opening 7, for the reception of a tooth of a sprocket wheel (not shown).

The arms 6 at one end of the link 1 have recesses 8 which open outwardly, and the arms 6 at the opposite end of the link have corresponding recesses which open inwardly, and thus there are formed at the ends of the arms 6, reduced fingers 9, overlapped as to adjoining links but not joined together as to adjoining link.

The ends of the fingers 9 are rounded, as shown at 10. The recesses 8 form shoulders 11 at right angles to the plane in which the link 1 is located. The fingers 9 of one link are disposed in the recesses 8 of the next adjoining link, the rounded ends 10 of the fingers 9 of one link bearing against the shoulders 11 of the next adjoining link, as depicted in Fig. 2.

The transverse arms 5 have tapered recesses 12. The recesses 12 taper in opposite directions, lengthwise of the chain, as to the arms 5 of each link 1. There may be any number of the recesses 12, three recesses being shown in each arm 5. Flexible elements 14, preferably metal cables, extend through the recesses 12. Longitudinally divided, two-part, frusto-conical holders 15 are disposed in the recesses 12. At their wider ends, the holders 15 have flanges 16. The holders 15 and the flanges 16 are supplied with longitudinal grooves 17 for the reception of the cables 14. Tightening devices 18, such as bolts or screws, join together the flanges 16 of each holder 15, on opposite sides of the corresponding cable 14. The holders 15 thus are clamped tightly on the cables 14, and the holders, being received in the recesses 12 of the arms 5, prevent each link from slipping lengthwise of the cables 14, when the sprocket chain is assembled with a pair of sprocket wheels (not shown).

In Figs. 4 and 5, parts hereinbefore described have been designated by numerals already used, with the suffix "a". In this form of the invention, any desired number of sprocket chains, each constructed like the chain of Fig. 1, saving as hereinafter modified, are placed side by side, to accommodate a corresponding number of sprocket wheels disposed side by side. Ordinarily, but not of necessity, a single cable 14a passes through the arms 5a, on each side of the body 4a. The arms 5a of the links of adjoining chains have recesses 80 and fingers 90, corresponding in a general way, respectively, to the parts 8 and 9 of Fig. 1. The fingers 90 are disposed side by side and are connected by securing elements 20, such as bolts. The fingers 90 are not rounded at their ends, as shown at 10 in Fig. 2, but engage squarely with the shoulders 111, corresponding to the shoulders 11 of Fig. 2, there being no occasion to give the multi-part chain of Fig. 4 a crosswise flexibility.

The device is very simple in construction, in either of its forms, and will be found efficient to consummate the objects set forth in the opening portion of this specification.

Having thus described the invention, what is claimed is:

1. A sprocket chain including links, each in the form of a double cross, comprising a pair of longitudinal members and a pair of transverse members; the longitudinal and transverse members defining a body, transverse arms external to the body, and longitudinal arms external to the body, the body having an opening for the reception of a tooth of a sprocket wheel; flexible elements disposed on opposite sides of the body, and means for securing the flexible elements to the transverse arms.

2. A sprocket chain constructed as set forth in claim 1, wherein the end portions of the longitudinal arms of adjoining links are overlapped.

3. A sprocket chain constructed as set forth in claim 1, wherein the end portions of the longitudinal arms of adjoining links are overlapped in terminally-abutting, rocking, disconnected relation.

4. A sprocket chain constructed as set forth in claim 1, wherein said means embodies holders detachably mounted on the flexible elements, between the transverse arms of each link, and engaging the transverse arms of each link.

5. A sprocket chain constructed as set forth in claim 1, wherein said means embodies oppositely-tapered holders detachably mounted on the flexible elements between the transverse arms of each link, the transverse arms of each link having oppositely-tapered seats, receiving the holders.

6. A sprocket chain link in the form of a double cross, all portions of the link being disposed in a common plane, the link comprising a pair of parallel longitudinal members and a pair of parallel transverse members, the longitudinal members being disposed at right angles to the transverse members, the longitudinal and transverse members defining a rectangular body, transverse arms external to the body, and longitudinal arms external to the body, the body having an opening for the reception of the tooth of a sprocket wheel.

7. A sprocket chain link constructed as set forth in claim 6, wherein the longitudinal arms have reduced end portions, adapted to be overlapped on the corresponding reduced end portions of a like, longitudinally-adjoining link.

8. A sprocket chain link constructed as set forth in claim 6, wherein the transverse arms have reduced end portions adapted to be overlapped on the corresponding reduced end portions of a like, transversely-adjoining link.

9. A sprocket chain link constructed as set forth in claim 6, and wherein all of the arms have reduced end portions adapted to be overlapped upon the corresponding end portions of other, similar adjoining links.

LEWIS BISHOP.